United States Patent [19]

Walsh

[11] Patent Number: 5,867,161
[45] Date of Patent: *Feb. 2, 1999

[54] UNIFORM MNEMONIC ASSOCIATIONS OF COMPUTER RESOURCES TO GRAPHICAL IMAGES

[76] Inventor: Aaron E. Walsh, 18 Haviland St., #27, Boston, Mass. 02115

[*] Notice: This patent issued on a continued prosecution application filed under 37 CFR 1.53(d), and is subject to the twenty year patent term provisions of 35 U.S.C. 154(a)(2).

[21] Appl. No.: 512,431

[22] Filed: Aug. 8, 1995

[51] Int. Cl.$^6$ ........................................ G06F 3/14
[52] U.S. Cl. .......................... 345/347; 345/352; 345/975; 345/357
[58] Field of Search .................................... 395/347, 352, 395/975, 356, 357, 353, 762, 936; 345/347, 352, 975, 356, 357, 353; 707/501, 901

[56] References Cited

U.S. PATENT DOCUMENTS

| | | | |
|---|---|---|---|
| 4,569,026 | 2/1986 | Best | 345/327 |
| 5,036,459 | 7/1991 | den Haan et al. | 364/200 |
| 5,142,683 | 8/1992 | Burkhardt, Jr. et al. | 395/725 |
| 5,293,619 | 3/1994 | Dean | 395/650 |
| 5,347,628 | 9/1994 | Brewer et al. | 345/351 |
| 5,349,658 | 9/1994 | O'Rourke et al. | 345/349 |
| 5,375,207 | 12/1994 | Blakely et al. | 395/200 |
| 5,406,557 | 4/1995 | Baudoin | 370/61 |
| 5,408,333 | 4/1995 | Kojima et al. | 358/400 |
| 5,442,749 | 8/1995 | Northcutt et al. | 395/200.09 |
| 5,500,929 | 3/1996 | Dickinson | 345/356 |
| 5,500,936 | 3/1996 | Allen et al. | 345/348 |
| 5,539,736 | 7/1996 | Johnson et al. | 370/60 |
| 5,546,521 | 8/1996 | Martinez | 345/338 |
| 5,579,472 | 11/1996 | Keyworth, II et al. | 395/326 |
| 5,634,019 | 5/1997 | Koppolu et al. | 345/352 X |
| 5,664,133 | 9/1997 | Malamud et al. | 345/352 |

OTHER PUBLICATIONS

"Sharing Views and Interactions with Single–User Applications," Saul Greenburg, Advanced Technologies Alberta Research Council, Calgary, Alberta, Canada, 1990, pp. 227–237.

"A Comparison of Application Sharing Mechanisms in Real–Time Desktop Conferencing Systems," S.R, Abuja, et al., AT&T Bell Laboratories, Holmdel, New Jersey, pp. 238–248, 1990.

"Experiences in Developing Collaborative Applications Using the World Wide Web Shell," Andreas Girgensohn, et al., NYNEX Science and Technology, White Plains, New York, University of Toronto, Department of Computer Science, Toronto, Ontario, Canada, 1996, pp. 246–255.

"The Anti–Mac Interface," Don Gentner and Jakob Nielson, 1996, pp. 70–82.

"Madefast: Collaborative Engineering Over the Internet," Mark R. Cutkosky, et al., Sep. 1996, pp. 78–87.

"Putting Innovation to Work: Adoption Strategies for Multimedia Communication Systems," Ellen Francik, et al., Dec. 1991, pp. 53–63.

"Toward an Open Shared Workspace: Computer and Video Fustion Approach of Teamworkstation," Hiroshi Ishii, et al., Dec. 1991, pp. 37–50.

"Design and Implementation of a Shared Workspace by Integrating Individual Workspace," Massaki Ohkubo, et al., Apr. 25–27, 1990, pp. 142–146.

*Primary Examiner*—Raymond J. Bayerl

[57] ABSTRACT

A graphical user interface arrangement for use in connection with a computer system, the computer system providing a plurality of accessible resources. The graphical user interface arrangement enables the computer system to display graphical images from one or more of a plurality of image sets as selected by the user, and is responsive to user resource information display input to enable the display of resource identification information from a resource list that is associated with a displayed image. In response to user resource selection input selecting a resource identified in the displayed resource identification information, the graphical user interface arrangement provides access to the associated resource.

32 Claims, 8 Drawing Sheets

UNIFORM MNEMONIC ASSOCIATIONS OF COMPUTER RESOURCES TO GRAPHICAL IMAGES

FIELD OF THE INVENTION

The invention relates generally to the field of digital computer systems and more particularly to graphical user interface arrangements for facilitating the easy access and use by users and applications to a variety of resources which may be used by a computer system, which resources may be located both locally to the computer system and remote therefrom over, for example, the Internet communications network.

BACKGROUND OF THE INVENTION

Over the past several years, the processing power, information storage capacity and flexibility of computer systems such as personal computers have increased markedly. As a result, personal computers are finding increased use in business and, in particular, the home. Powerful personal computers permit the user to process data that is stored on the computer itself, and also to access myriad amounts of information over computer networks such as the Internet.

There are, however, several problems that reduce the efficient use of computers by the general public. One problem arises from the computers increased information storage capacity, namely, that it becomes more difficult for a user to find information on the computer. Information is typically stored in files, which, in turn, are organized in tree-structured "folders" (in an Apple Macintosh®) or "directories" (in an IBM-compatible Personal Computer). Although the user can name the folders, directories and files with mnemonic names which may suggest the types of information stored therein, it often becomes difficult to find files, particularly as the number of folders, directories and files that a computer can store increases. A second problem arises when a user attempts to obtain information over a computer network such as the Internet. Typically, communication with a particular information provider over the Internet requires use of arcane communications protocols, including providing complex addresses to identify the provider. Protocol errors, such as typographical errors in providing the addresses, can make communications with an information provider quite frustrating if not impossible for novice computer users.

SUMMARY OF THE INVENTION

The invention provides a new and improved graphical user interface arrangement for facilitating the easy access and use by users and applications to a variety of resources which may be used by a computer system, which resources may be located both locally to the computer system and remote therefrom over, for example, the Internet communications network.

In brief summary, in one aspect the invention provides a new graphical user interface arrangement for use in connection with a computer system, the computer system providing a plurality of accessible resources. The graphical user interface arrangement includes a plurality of image sets, each image set including at least one graphical image, a like plurality of resource lists, each resource list being associated with one of said image sets, each resource list providing a pointer to at least one of said resources; and a control subsystem. The control subsystem initially enables the computer system to display images from said image sets as selected by the user, the control subsystem is responsive to user resource information display input to enable the display of resource identification information from the resource list associated with a displayed image, and is further responsive to user resource selection input selecting a resource identified in the displayed resource identification information to provide access to the associated resource.

In another aspect, the invention provides a method of controlling a computer system that provides a plurality of accessible resources. The computer system includes a plurality of image sets, each image set including at least one graphical image, and a like plurality of resource lists, each resource list being associated with one of said image sets, each resource list providing a pointer to at least one of said resources. In accordance with the method the computer system is initially enabled to display images from said image sets as selected by the user. Thereafter, the computer system is enabled to display resource identification information from the resource list associated with a displayed image and a resource identified in the displayed resource identification information is selected to provide access to the associated resource.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
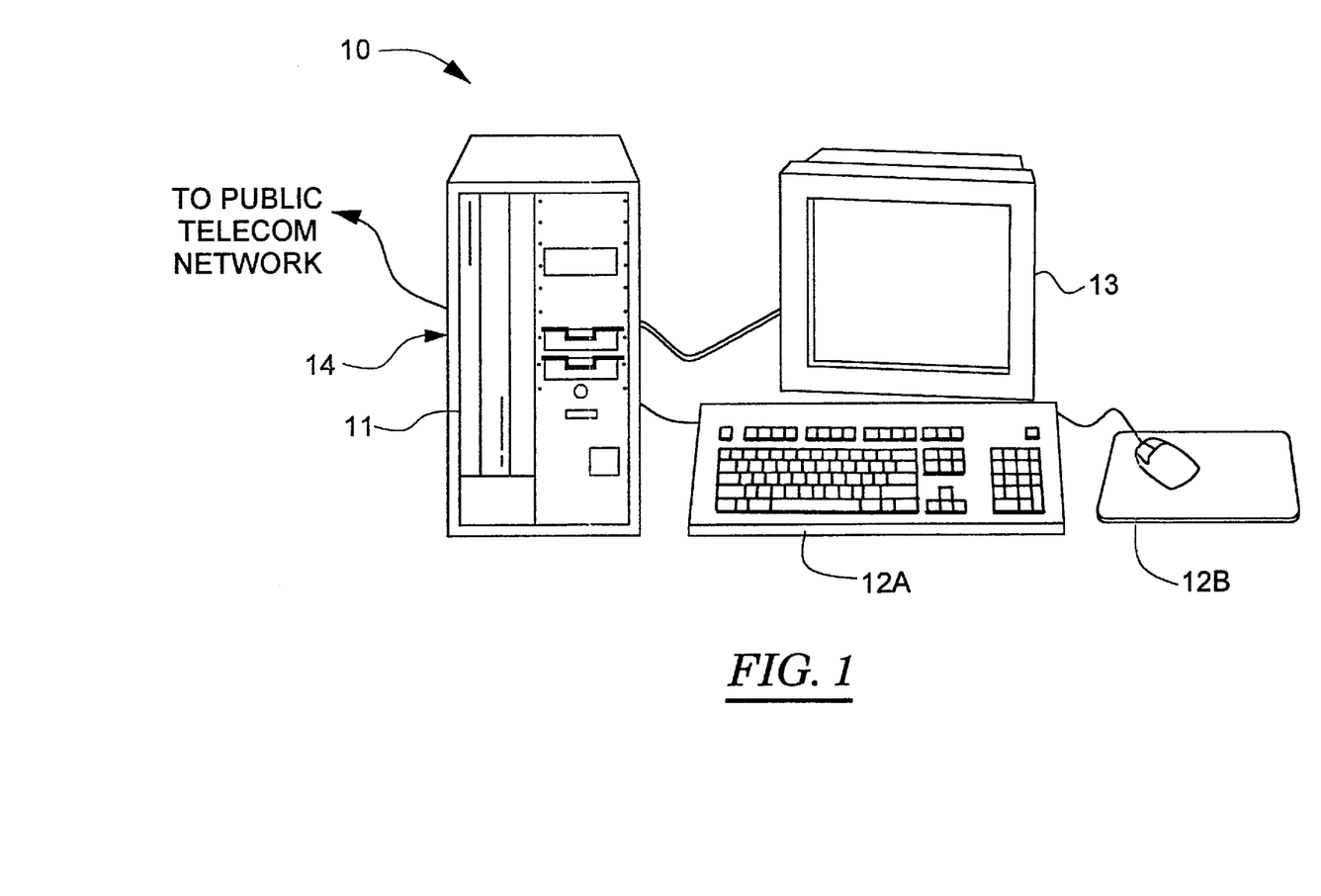
FIG. 1 depicts an illustrative computer system incorporating a new graphical user interface arrangement constructed in accordance with the invention.

FIG. 1 depicts an illustrative computer system 10 constructed in accordance with the invention. With reference to FIG. 1, the computer system 10 in one embodiment includes a processor module 11 and operator interface elements comprising operator input components such as a keyboard 12A and/or a mouse 12B (generally identified as operator input element(s) 12) and an operator output element such as a video display device 13. The illustrative computer system 10 is of the conventional stored-program computer architecture. The processor module 11 includes, for example, processor, memory and mass storage devices such as disk and/or tape storage elements (not separately shown) which perform processing and storage operations in connection with digital data provided thereto, as well as a modem (represented by link 14). The operator input element(s) 12 are provided to permit an operator to input information for processing. The video display device 13 is provided to display output information generated by the processor module 11 on a screen 14 to the operator, including data that the operator may input for processing, information that the operator may input to control processing, as well as information generated during processing. The processor module 11 generates information for display by the video display device 13 using a so-called "graphical user interface" ("GUI"), in which information for various applications programs is displayed using various "windows." Although the computer system 10 is shown as comprising particular components, such as the keyboard 12A and mouse 12B for receiving input information from an operator, and a video display device 13 for displaying output information to the operator, it will be appreciated that the computer system 10 may include a variety of components in addition to or instead of those depicted in FIG. 1. The modem 14 facilitates connection of the computer system 10 to the public telecommunications network, allowing it to transmit information thereover, and receive information therefrom, in a conventional manner.

The invention provides a new graphical user interface arrangement for use in connection with computer system 10 that provides for the uniform association of a variety of resources, which are located both local and remote to the computer system 10, with tiles or icons depicting graphical images which are displayed by video display device 13, and for the relatively easy and uniform access to the resources. In one particular embodiment, the local resources include such elements as information files and applications programs which may be present on the computer system 10 itself or on other computer systems that may be connected to the computer system 10 over, for example, a local area network. In that same embodiment, the remote resources include such resources, such as "World Wide Web" pages, that may be accessed over the Internet through the modem 14. The resources are divided into a plurality of categories by the user, and resources in each category are associated with one or more of a plurality of graphical images as selected by the user. The subject matter of the image that the user selects to be associated with a particular category may relate to the category and thus operate as a mnemonic device to identify the category for the user and differentiate it from other categories. The user may enable the graphical user interface arrangement to, in turn, enable the computer system 10 to display one or more of the images, and may, by suitable manipulation of, for example, an input device such as mouse 12B, to display identifications of the resources associated with a displayed image. In one particular embodiment, the graphical user interface arrangement displays the resource identifications as a list in a pop-up menu 25 which is displayed on the video display device 13, and the user may select and actuate a resource by "clicking" on its identification in the pop-up menu 25 in a conventional manner. If the actuate a file, the computer system 10 may load the application which created the file and make the actuated file available to the user. Similarly, if the user actuates an application, the computer system 10 may load the application and make it available to the user. On the other hand, if the user actuates a remote resource which is available over, for example, the Internet, the graphical user interface arrangement enables the computer system 10 to access the resource over the Internet, in the process providing the Internet addresses that are required to access the resource. Accordingly, the graphical user interface arrangement enables the user to associate categories of resources, both local and remote to the computer system 10, with graphical images, and further provides for a uniform mechanism to access the resources.

Figure 2:
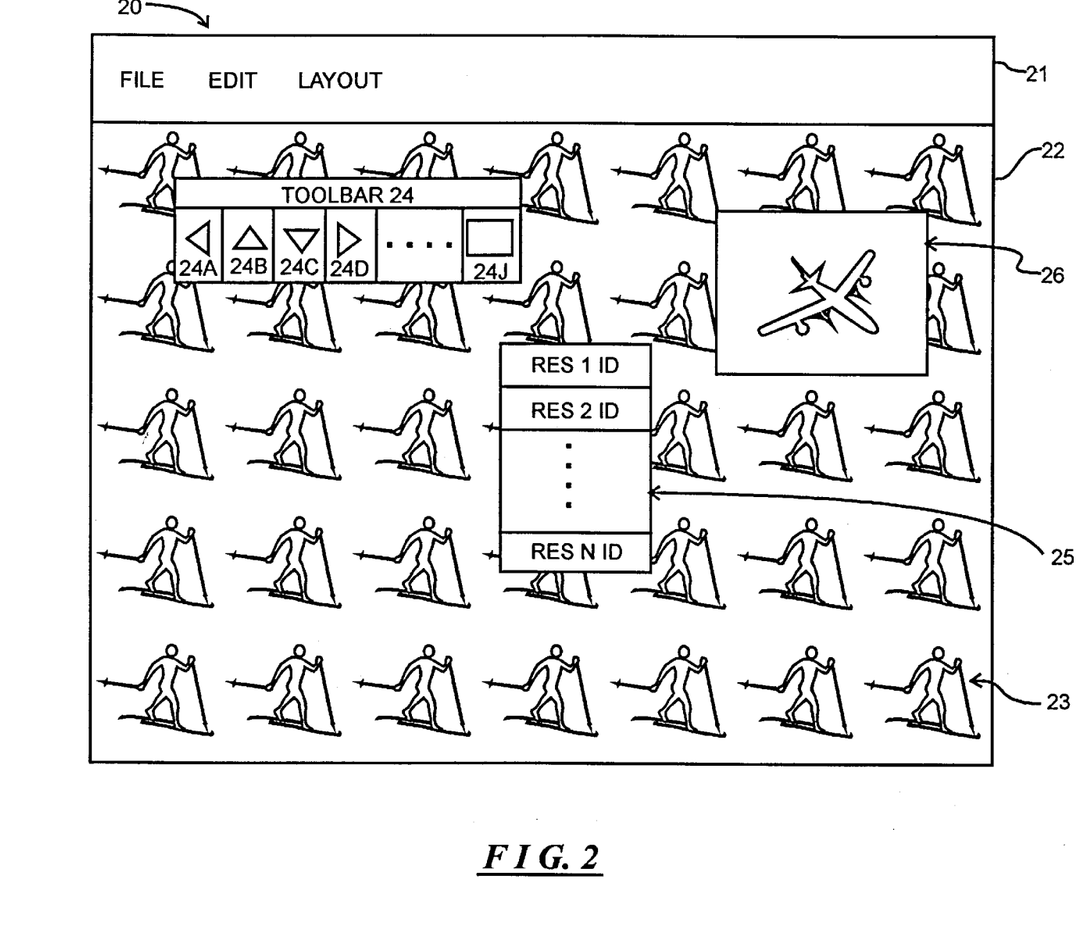
FIG. 2 depicts a screen display that is useful in understanding the operation of the new graphical user interface arrangement.

With this background, the graphical user interface arrangement will be described in detail in connection with FIGS. 2 through 5D. FIG. 2 generally depicts an illustrative screen display 20 useful in understanding the graphical user interface arrangement constructed in accordance with the invention. With reference to FIG. 2, screen display 20 includes a menu bar 21 and a desktop region 22. The menu bar 21 includes a plurality of menu items, illustratively identified by such words as "FILE," "EDIT," "LAYOUT," although it will be appreciated that other menu items may also be included which are identified by other words or by graphical images. As is conventional, each menu item in the menu bar 21 is associated with a drop-down menu (not shown), which the user may enable to be displayed by actuating the menu item using an input device such as, for example, the mouse 12B. The drop-down menu typically includes commands which the user may select to control operations by the computer system 10.

The desktop region 22 is used to display output information generated by applications programs being processed by the computer system 10. Applications programs may display their output information either in the form of individual windows or in "full screen" format as selected by the user. (Generally, the position of an application program's window is selectable by the user, and the user may position a window to occupy a portion of the screen display 20 comprising the menu bar 21 as well as the desktop region 22. Similarly, when an application program's output information is being displayed in "full screen" format, the output information may also occupy the portion of the screen display 20 occupied by the menu bar 21.) If the user has not selected an applications program to provide its output information in "full screen" format, the portion, if any, of the desktop region 22 that is not occupied by an applications program's window displays a "wallpaper" image which may be selected by the user. (Typically, if the user does not select an image for the wallpaper, the computer system 10 may default to a uniform color display, such as a shade of gray.) In accordance with the invention, the graphical user interface arrangement, when actuated by the user as an applications program, provides a wallpaper 23 and a toolbar 24, both of which are displayed by the video display device 13 in the desktop region 22. The wallpaper 23 as illustrated in FIG. 2 comprises an image (illustratively a skiing figure) which is tiled over the entire area of display wallpaper 23 in a series of rows and columns. The graphical user interface arrangement may make use of a number of images, which are arranged in a series of image sets as will be described below in connection with FIG. 3, and the user may cycle through images in the sets to select an image for the wallpaper 23 by actuating various navigational push-buttons 24A through 24D of the toolbar 24 by an input device such as the keyboard 12A or mouse 12B in a conventional manner. The toolbar 24, in addition to providing the image cycling navigational push-buttons 24A through 24D, also provides other push-buttons 24E, . . . , 24J (generally identified by reference numeral 24j) which may be used to control operations of graphical user interface arrangement.

Each of the images which may be selected as the wallpaper 23 may be associated with one or more local or remote resources as described above, and the user may obtain a listing of the resources which are associated with the image currently selected as the wallpaper 23 by clicking thereon using the mouse 12B. When the user clicks on the wallpaper 23, the graphical user interface arrangement enables the video display device 13 to display a pop-up menu 25 which contains a listing of the identifications of the various resources (identified "RES 1 ID," "RES 2 ID,". . . , "RES N ID" in FIG. 2) which are associated with that image. The user can obtain access to a resource listed in the pop-up menu 25 by actuating its identification "RES n ID" by the mouse 12B in a conventional manner. In response to actuation of a resource identification by the user, the graphical user interface arrangement will provide access to the identified resource. If the resource is a local resource, such as an applications program or file, the graphical user interface arrangement will enable the computer system 10 load the applications program and (if a particular file is specified) enable the applications program to load the file.

On the other hand, if the resource is a remote resource available over, for example, the Internet, the graphical user interface arrangement will enable the computer system 10 to obtain access to the remote resource, in the process providing any address information that may be necessary to access the remote resource. In addition, the graphical user interface arrangement will call Internet interface programs which may be required to access information over the Internet, and provide the address information to the called Internet interface programs. For example, in the case in which the remote resource is a "World Wide Web" page, the graphical user interface arrangement will call a conventional "Browser" program, such as the conventional "Mosaic" or "Netscape Navigator" program distributed by Netscape Communications, Inc., and provide the Internet address information thereto. The Browser program will then use the Internet address information to access the World Wide Web page.

The graphical user interface arrangement also enables a user to maintain a display in the desktop region 22 of selected images by means of "surfboards" such as surfboard 26, and to access the resources associated with the "surfboarded" images in the same manner as those associated with the image selected as the wallpaper 23. An image (illustratively in FIG. 2 an airplane) may be "surfboarded" by actuation of an appropriate push-button 24j of the toolbar 24 or of a menu item which may be provided by the menu bar 21 to enable the user to control the graphical user interface arrangement, or by selecting a resource through the wallpaper 23. The graphical user interface arrangement also enables the user to associate with an image groups of one or more surfboarded images as a single resource, and to enable the user to, in turn, enable display of the image surfboards by actuating the resource identification as described above.

Figure 3:
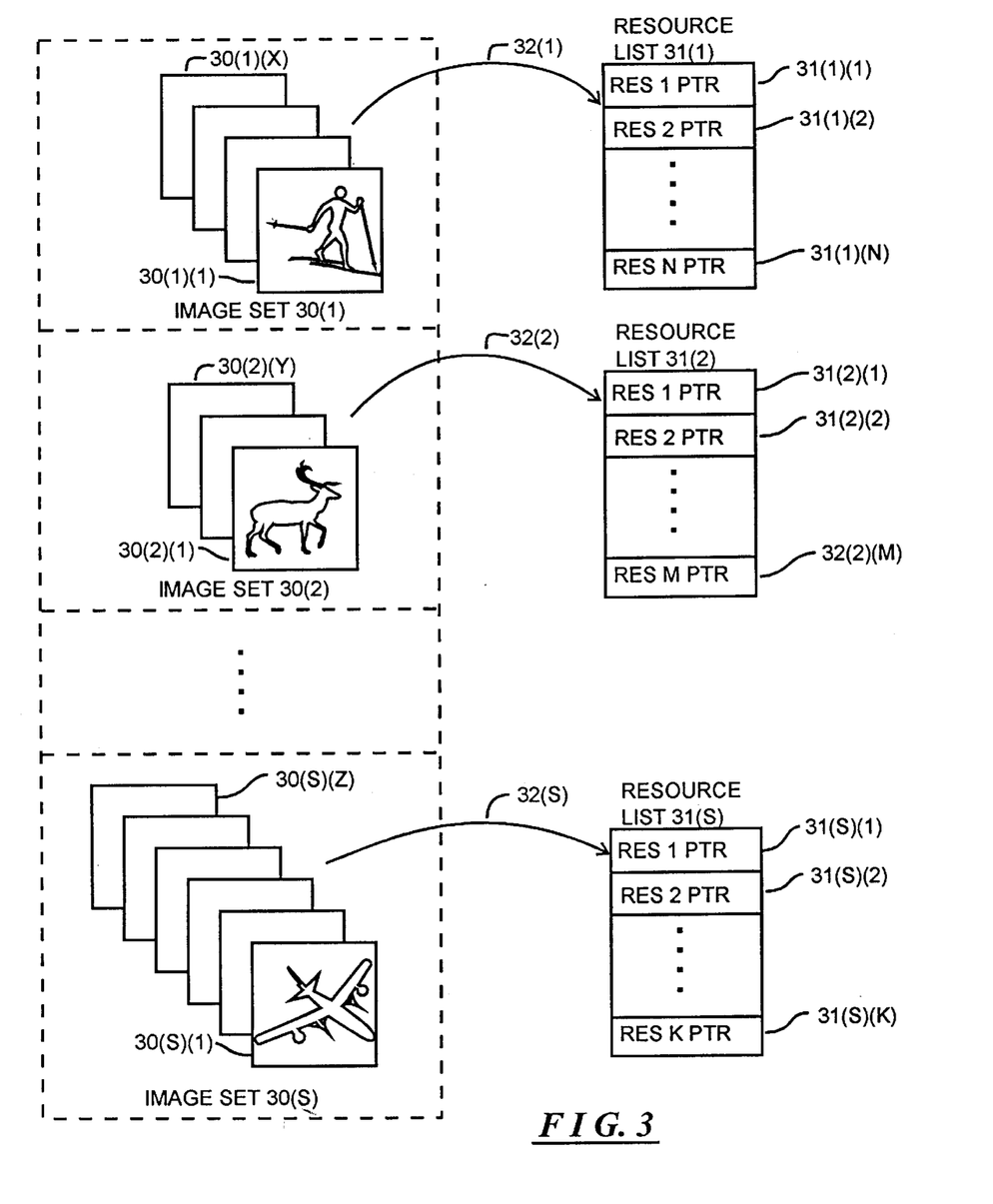
FIG. 3 depicts a data structure that is useful in understanding the operation of the graphical user interface arrangement.

FIG. 3 depicts various structures which are used in connection with the graphical user interface arrangement. With reference to FIG. 3, the graphical user interface arrangement includes a plurality of image sets 30(1) through 30(S) (generally identified by reference numeral 30(s)) each of which includes one or more images generally identified by reference numeral 30(s)(t). The images 30(s)(t) in each image set 30(s) may be represented by an image file stored on the computer system 10 in any convenient form; in one embodiment, the image file stores the image as a bit-mapped graphical image which the graphical user interface arrangement may access to facilitate the image display as the wallpaper 23 or on a surfboard 26. Each image set may have a name or title, and the images 30(s)(t) (and, thus, the related image files) that are associated with a particular image set 30(s) may be identified by a table (not shown) that identifies image sets and the images associated therewith. For example, the skiing figure image used to form the wallpaper 23 in FIG. 2 may comprise one of a plurality of images that are associated with a "Sports" image set 30(1), and the airplane image on the surfboard 26 may comprise one of a plurality of images that are associated with a "Transportation" image set 30(S). Similarly, a moose image 30(2)(1) may comprise one of a plurality of images that are associated with an "Animals" image set 30(2).

Each image set 30(1) through 30(S) is associated with a resource list 31(1) through 31(S) (generally identified by reference numeral 31(s)), with the associations being represented in FIG. 3 by arrows 32(1) through 32(S). Each resource list 31(s), in turn, includes a plurality of entries 31(s)(u), each of which is associated with a resource that is associated with the images in the image set 30(s). Thus, if image set 30(1) is associated with "N" resources, the resource list 31(1) that is associated with image set 30(1) will have "N" entries identified by reference numeral 31(1)(1) through 31(1)(N). Similarly, if image set 30(2) is associated with "M" resources, the resource list 31(2) that is associated with image set 30(2) will have "M" entries identified by reference numeral 31(2)(1) through 31(2)(M, and if image set 30(S) is associated with "K" resources, the resource list 31(S) that is associated with image set 30(S) will have "K" entries identified by reference numeral 31(S)(1) through 31(S)(K). Each entry 31(s)(u), in turn, includes a resource identification and a pointer to identify how the resource can be called. The graphical user interface arrangement uses the resource identifications in the various entries 31(s)(u) in the resource list 31(s) as the various menu items "RES n ID" in the pop-up menu 25 that it will display when enabled by the user as described above in connection with FIG. 2. In addition, the graphical user interface arrangement uses the resource pointer to facilitate accessing the respective resource when selected by the user. Accordingly, if the resource is a local resource such as a file or applications program, the resource pointer will provide a complete filename, including the path and, if necessary, the particular device on which the file or applications program is stored. On the other hand, if the resource is a remote resource accessed over the Internet, the resource pointer will comprise an Internet address for use by the Internet access program called by the graphical user interface arrangement.

Figure 4:
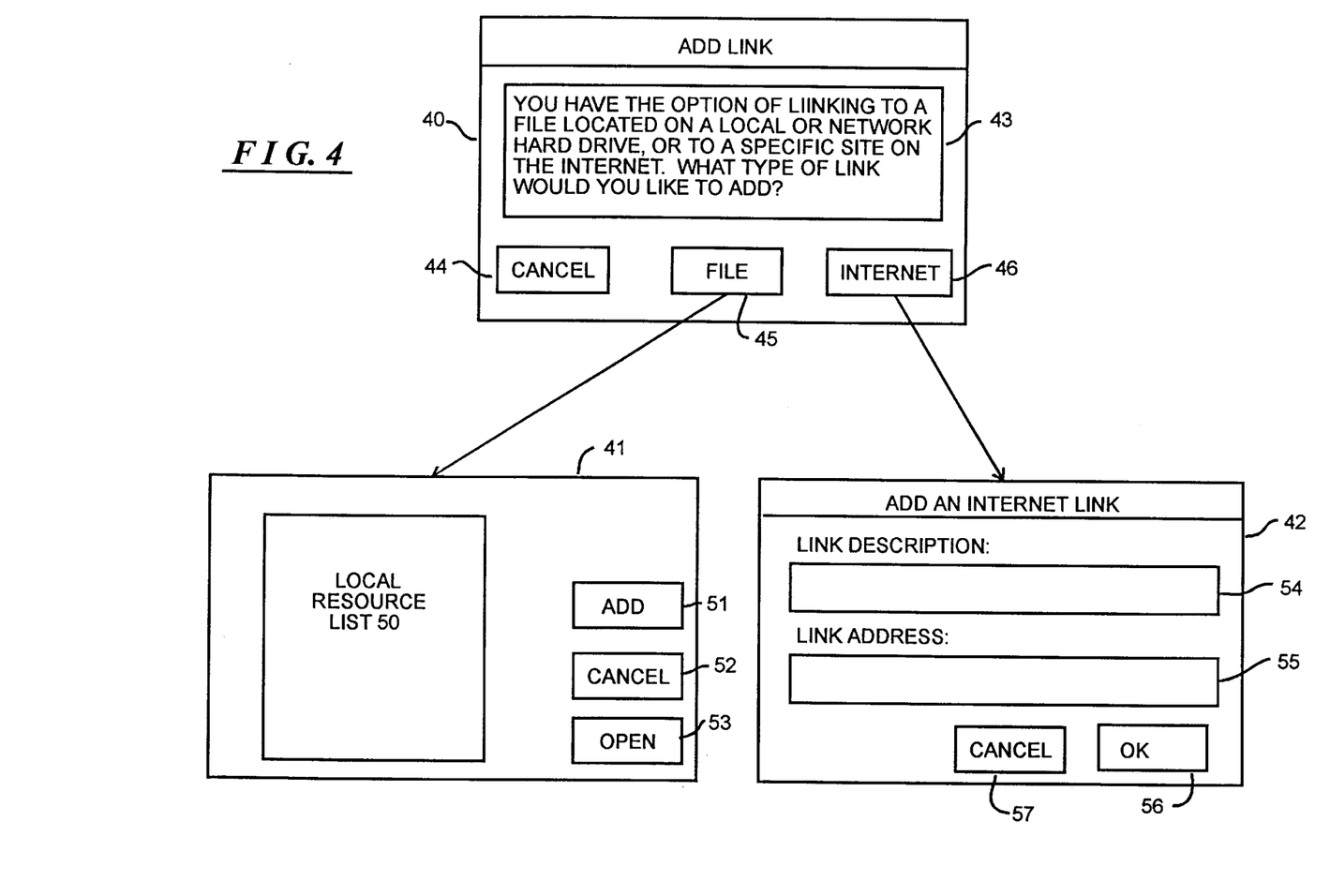
FIG. 4 depicts a further screen display that is useful in understanding the operation of the new graphical user interface arrangement.

The resources that are listed in the resource list 31(s) associated with any particular image set 30(s) are selected by the user, as will be described below in connection with FIG. 4, and thus the user can associate any image set 30(s) with a set of resources using any criteria that he or she deems convenient. Thus, for example, if image set 30(1) is deemed a "Sports" image set, the user may associate, for example, local resources such as files containing sports information with the image set 30(1), and in addition may associate remote resources such as Internet discussion groups and World Wide Web pages directed to sports topics. Similarly, if image set 30(2) is deemed an "Animals" image set, the user may associate local resources such as files containing information concerning animals, ecology and conservation with the image set 30(2), and in addition may associate remote resources such as Internet discussion groups and World Wide Web pages directed to such topics. In addition, if image set 30(S) is deemed a "Transportation" image set, the user may associate local resources such as files containing information concerning transportation with the image set 30(S), and in addition may associate remote resources such as Internet discussion groups and World Wide Web pages directed to such topics. Thus, the image sets 30(s) may be used to define categories, each category being mnemonically represented by the type(s) of image(s) 30(s)(t) in the respective sets 30(s), which may facilitate access by the user to resources associated with the categories.

The graphical user interface arrangement has been described in FIG. 3 as providing one resource list 31(s)

associated with each image set 30(s). In that case, the same resource list 31(s) will be used in connection with all of the images 30(s)(t) that are associated with the image set 30(s). It will be appreciated, however, that the various images 30(s)(t) in an image set 30(s) may be associated with different resource lists, with each resource list including resources which the user may mnemonically relate to the particular image 30(s)(t) in the image set 30(s). Thus, for example, if the "Sports" image set 30(1) comprises images depicting various sporting activities, such as skiing, tennis, baseball, etc., the user may associate resources relating to each sporting activity to the respective image. Similarly, if the "Animals" image set 30(2) comprises images 30(2)(t) depicting various animals such as deer, birds, etc., the user may associate resources relating to each type of animal to its image 30(2)(t), and if the "Transportation" image set 30(S) comprises images depicting various types of transport means, such as airplanes, automobiles, ships, etc., the user may associate resources relating to each type of transportation to its respective image 30(S)(t). In those cases, one image in each image set 30(s) may also be provided to represent the image set 30(s), so that if that image is selected all of the resources associated with all of the images may be displayed when the pop-up menu associated therewith is displayed.

As noted above, the graphical user interface arrangement provides a facility by which the user associates resources, both local and remote, to the image sets 30(s) so that the resources may be mnemonically related to the image sets 30(s) using any criteria of convenience to the user. The graphical user interface arrangement provides various dialog boxes, which will be described in connection with FIG. 4, for use by the user to provide the resource/image set associations. With reference to FIG. 4, the graphical user interface arrangement provides an "add link" dialog box 40, a file link dialog box 41 and an Internet link dialog box 42 to facilitate creation of the resource/image set associations. The file link dialog box 41 enables the user to establish an association between an image set 30(s) and a local resource, and the Internet link dialog box 42 enables the user to establish an association between an image set 30(s) and a remote resource. The "add link" dialog box 40, in turn, provides a uniform access to both the file link dialog box 41 and the Internet link dialog box 42. The graphical user interface arrangement enables the user, in turn, to access the "add link" dialog box 40 through an "add link" menu item which may be displayed in a drop-down menu accessible through a menu item provided in the menu bar 21 (FIG. 2) or the pop-up menu 25 which is displayed as described above.

More specifically, when a user actuates an "add link" menu item while, for example, an image from an image set 30(s) is displayed as the wallpaper 23, the graphical user interface arrangement enables the computer system 10 to display the "add link" dialog box 40 on the video display device 13 (FIG. 1). The "add link" dialog box includes an instructional field 43 and three push-buttons 44 through 46, including a "cancel" push-button 44, a "file" push-button 45 and an "Internet" push-button 46. If the user, using, for example, the mouse 12B, actuates the "cancel" push-button 44, the computer system 10 removes the "add link" dialog box 40 from the display 13. However, if the user actuates the "file" or the "Internet" push-buttons 45 or 46, the computer system 10 enables the file link dialog box 41 or the Internet link dialog box 42, respectively, to be displayed by the display 13.

The file link dialog box 41 includes a local resource list 50, which contains a list of local applications programs and files that are available and several push-buttons 51 through 53, including an "add" push-button 51, a "cancel" push-button 52 and an "open" push-button 53. To add an association to a local resource listed in the resource list, the user initially selects a resource from the local resource list using, for example, the mouse 12B in a conventional manner, and actuates either the "add" push-button 51 or the "open" push-button 53. If the user actuates the "add" push-button 51, the graphical user interface arrangement will add the association to the resource list 31(s) for the appropriate image set 30(s) and remove the dialog box 41 from the video display device 13. Similarly, if the user actuates the "open" push-button 53, the graphical user interface arrangement will also add the association to the resource list 31(s) for the appropriate image set 30(s) and remove the dialog box 41 from the video display device 13, and in addition will open the resource by loading the applications program or calling the file. On the other hand, if the user actuates the "cancel" push-button 52, the computer system 10 removes the file link dialog box 41 from the video display device 13.

The Internet link dialog box 42 includes a plurality of fields, including a "Link Description" field 54 and a "Link Address" field 55, an "OK" push-button 56 and a "Cancel" push-button 57. The user, using an input device such as keyboard 12A (FIG. 1) may enter textual information into both the "Link Description" field 54 and the "Link Address" field 55, including, respectively a textual description of a remote resource and an Internet address used to obtain access to the remote resource. If, after entering the information in fields 54 and 55, the user actuates the "OK" push-button, the graphical user interface arrangement will add the information from the fields 54 and 55 to the resource list 31(s) for the appropriate image set 30(s) and remove the dialog box 41 from the video display device 13. On the other hand, if the user actuates the "cancel" push-button 57, the computer system 10 removes the Internet link dialog box 41 from the video display device 13.

The graphical user interface arrangement further provides a facility by which the user removes associations between resources, both local and remote, and image sets 30(s). In that facility, the user may enable the appropriate image set's pop-up menu 25 (FIG. 2) to be displayed, select the resource to be removed, and enter a suitable keystroke or combination of keystrokes on the keyboard 12A (FIG. 1) (such as by depressing a "Delete" key) or actuate suitable menu items in the pop-up menu 25 or a menu item in the menu bar 21. Thereafter, the graphical user interface arrangement will remove the associated entry 31(s)(t) in the resource list 31(s) associated with the image set 30(s).

Figure 5A:
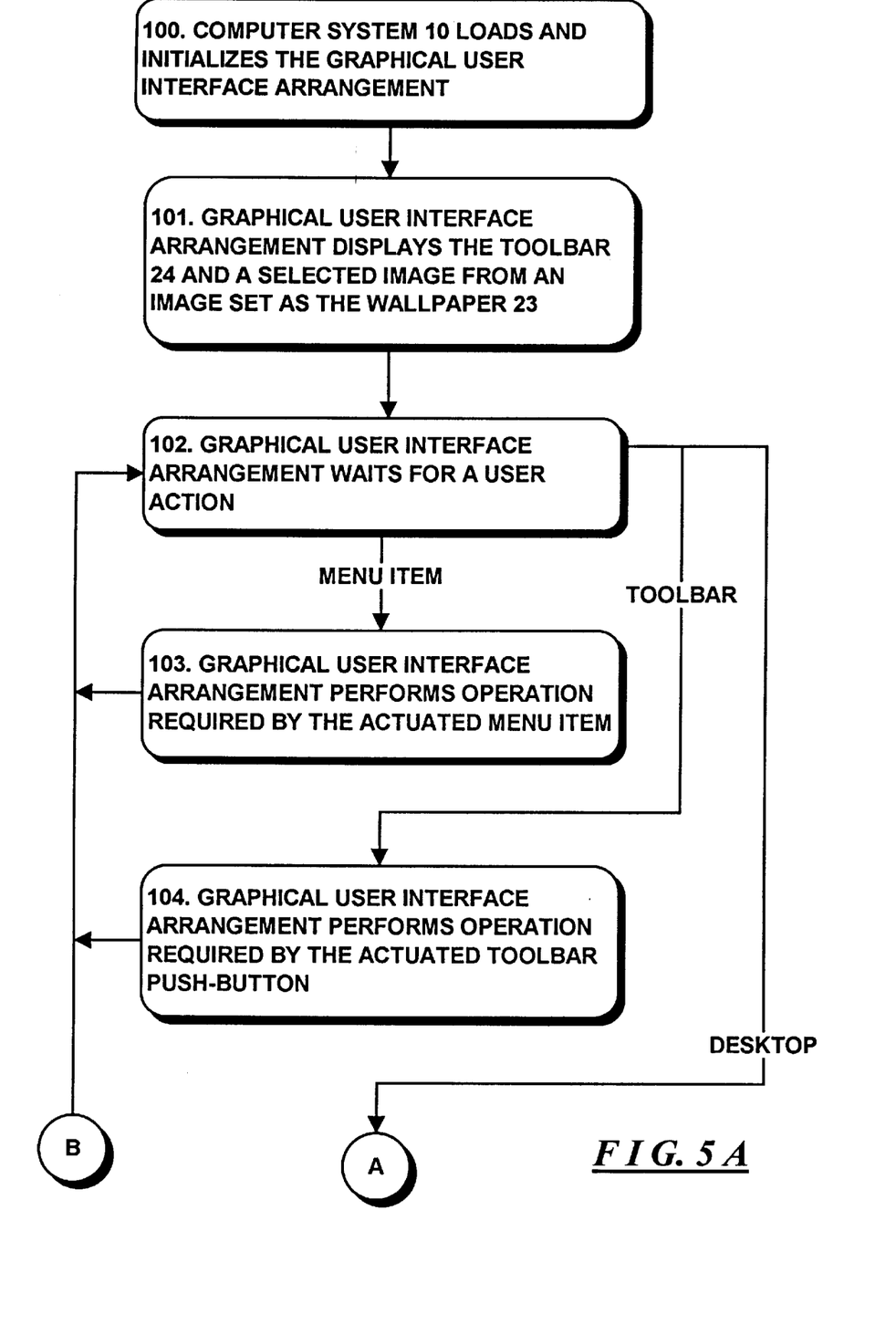
FIGS. 5A through 5D comprise a flow diagram illustrating the operations of the new graphical user interface arrangement.
Figure 5B:
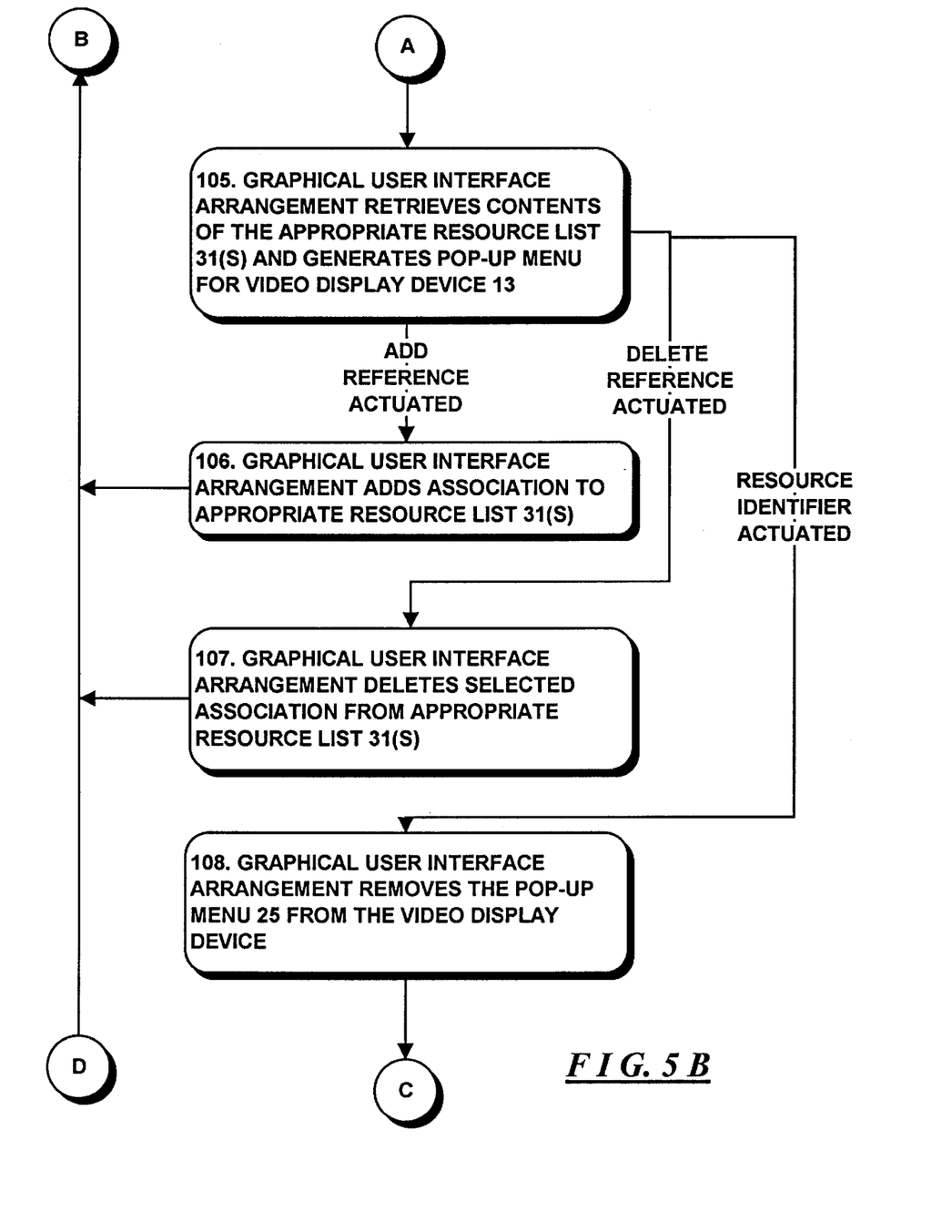
Figure 5C:
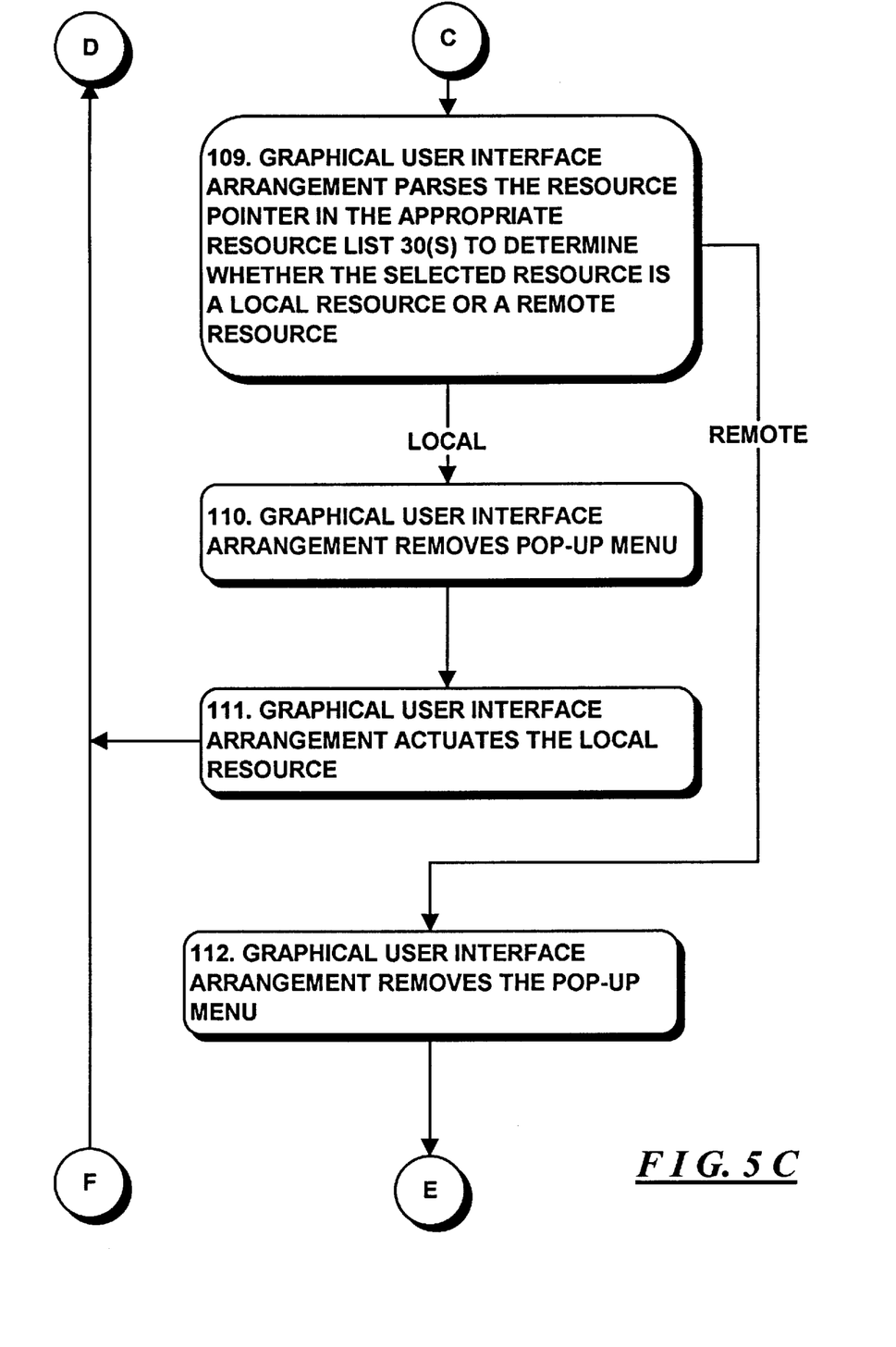
Figure 5D:
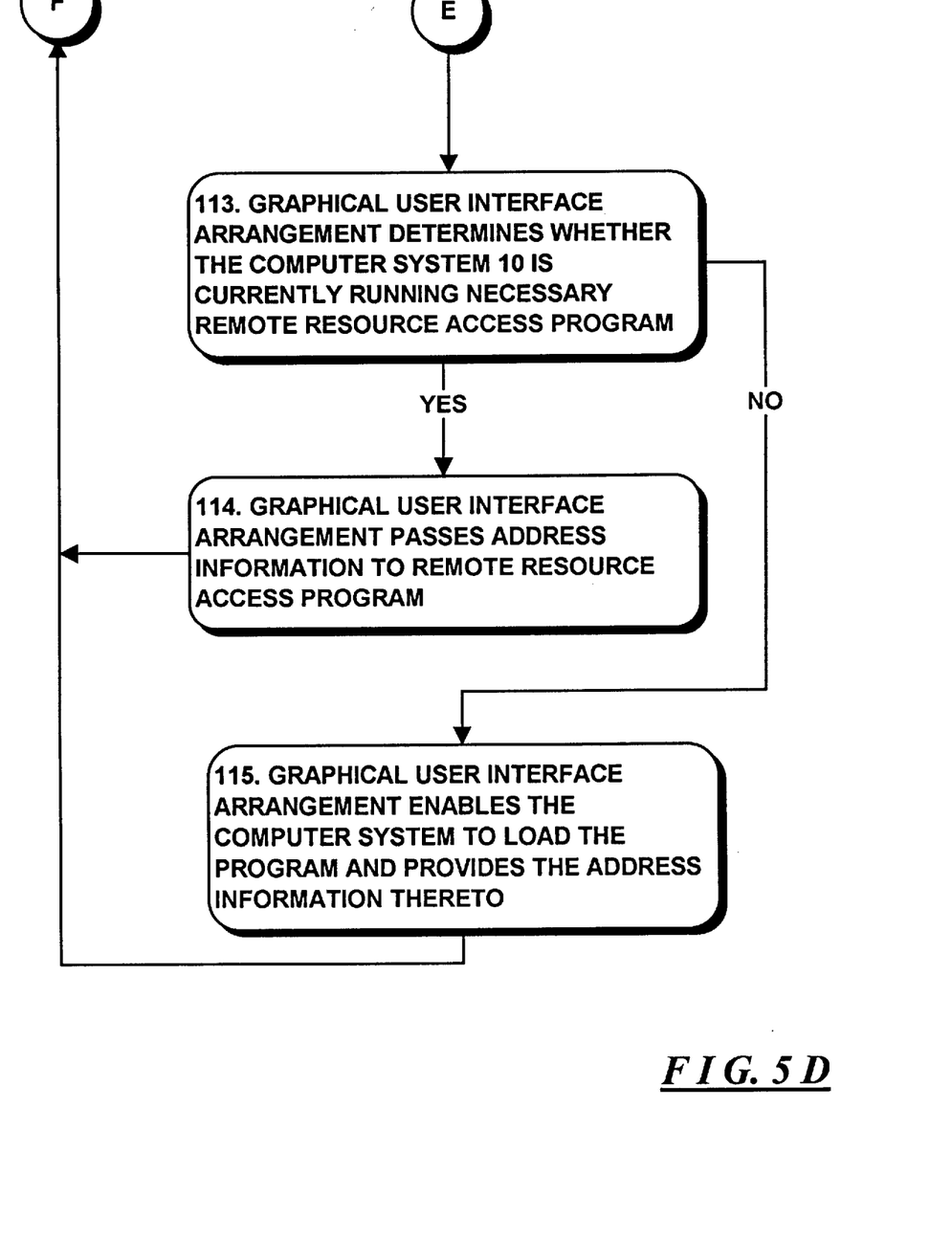

With this background, the detailed operations performed by the graphical user interface arrangement will be described in connection with the flow-chart depicted in FIGS. SA through 5D. With reference to FIG. 5A, when the computer system 10 first loads the graphical user interface arrangement (step 100), the graphical user interface arrangement will display the toolbar 24 and a selected image from an image set as the wallpaper 23 (step 101), and will wait for an action by the user (step 102), including actuation of a menu item of the menu bar 21, actuation of a push-button 24j of the toolbar 24 and a "desktop event" in which the user clicks on the wallpaper 23 or a surfboard 26 using the mouse 12B. If the user actuates a menu item, the graphical user interface arrangement sequences to step 103 to perform the operation required by the actuated menu item, and thereafter returns to step 102 to wait for the user's next action. Similarly, if the user actuates a push-button 24j of the toolbar 24, the graphical user interface sequences from step 102 to step 104 to perform the operation required by the actuated push-button, and thereafter returns to step 102 to wait for the user's next action.

On the other hand, if the user initiates a "desktop event" by clicking on the wallpaper 23 or a surfboard with the mouse 12B, the graphical user interface arrangement sequences to step 105. In that step, the graphical user interface arrangement will retrieve the contents of the appropriate resource list 31(s), that is, the resource list 31(s) associated with the wallpaper or surfboard on which the user clicked, and provide an appropriate pop-up menu 25 on the video display device 13. The graphical user interface arrangement's subsequent operations will depend on the user's subsequent actions. If the user selects an "add association" or a "remove association" menu item in the pop-up menu 25, the graphical user interface arrangement sequences to respective steps 106 or 107 to add or remove an association as selected by the user. Thereafter, the graphical user interface arrangement will remove the pop-up menu 25 from the video display device (step 108) and return to step 102 to wait for the user's next action.

However, if in step 105 the user actuates a resource identifier "RES n ID" in the pop-up menu 25, the graphical user interface will sequence to step 109. In that step, the graphical user interface will parse the resource pointer in the appropriate resource list 30(s) to determine whether the selected resource is a local resource or a remote resource. If the remote resource is a resource available over the Internet, for example, the pointer will comprise an address having a particular format which graphical user interface arrangement can identify by parsing. For example, for "World Wide Web" pages accessible over the Internet, the appropriate addresses currently begin with the text string "http://www." and if a resource pointer begins with such a text string the graphical user interface arrangement will determine that the resource is a remote resource. On the other hand, if the resource identifier does not have features corresponding to an Internet address, the graphical user interface arrangement will determine that the resource is a local resource.

If the graphical user interface arrangement determines in step 109 that the actuated resource identifier "RES n ID" in the pop-up menu 25 identifies a local resource, it will remove the pop-up menu 25 (step 110) and actuate the local resource as described above (step 111). In actuating the local resource, the graphical user interface arrangement will pass the resource identifier to the computer system's operating system program to enable it to call the resource in a conventional manner. If the local resource is already open, the operating system program need merely "switch" to it, that is, bringing it to the front of the display as the current resource. Thereafter, the graphical user interface arrangement will return to step 102 to wait for the user's next action.

On the other hand, if the graphical user interface arrangement determines in step 109 that the actuated resource identifier "RES n ID" in the pop-up menu 25 identifies a remote resource, it will remove the pop-up menu 25 (step 112), and determine whether the computer system 10 is currently running any necessary remote resource access programs, such as communications programs which necessary to access the Internet or Browser programs necessary to use the World Wide Web pages that may be referenced by the resource identifier (step 113). If the graphical user interface arrangement determines in step 113 that computer system 10 is currently running the necessary remote resource access program, it will pass the address information thereto (step 114), and the remote resource access program will thereafter provide the access to the requested remote resource. Following step 114, the graphical user interface arrangement will return to step 102 to wait for the user's next action.

If, on the other hand, the graphical user interface arrangement determines in step 113 that not currently running the necessary remote resource access program, it enables the computer system to load the program and provides the address information thereto (step 115). The remote resource access program will thereafter provide the access to the requested remote resource. Following step 115, the graphical user interface arrangement returns to step 102 to wait for the user's next action.

It will be appreciated that the invention provides a number of advantages. In particular, it provides a uniform mechanism by which a user can obtain access to both local and remote resources, so that the user does not have to consider whether the resources are local or remote to the computer when attempting to access them. In addition, it provides an arrangement by which the user can provide mnemonic associations between images which may be displayed on the video display device 13 and both local and remote resources, so that local resources which may be located in a number of folders or directories, as well as remote resources, may be mnemonically associated with a single image. Since images can often provide a better or more immediate mnemonic association to categories than use of textual indicators such as words, access to the resources by a user can be improved.

In one particular embodiment, several other features are provided for the graphical user interface arrangement. In accordance with one feature, an image set is provided to enable a user to purchase, using his or her computer, certain products which are mnemonically related to the images in the image set. In that case, the pop-up menu 25 (FIG. 2) includes a menu item which, when actuated, loads a program that enables an order form to be displayed on the video display device 13. After the user has filled in the order form, the program enables the information to be transmitted by the computer through the modem 14 over the public telecommunications system. In accordance with another feature, if the image set features, for example, artworks, images of historical figures or events, or missing children, the pop-up menu 25 includes a menu item which, when actuated, loads a program that enables information about the artwork, historical figure or event, or missing child then displayed, to be displayed on the video display device. In addition, while the toolbar 24 has been described as providing push-buttons 24j for controlling the graphical user interface arrangement, it will be appreciated that the toolbar 24 may also provide push-buttons that accelerate the display of pop-up menus 25 associated with certain image sets 30(s) as selected by the user. In that case, the user may enable a pop-up menu 25 that is associated with an image set 30(s) by actuating the appropriate push-button 24j, without having an image from the image set being displayed as the wallpaper 23 or on a surfboard 26.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A graphical user interface arrangement for use in connection with a computer system as an interface between a user and accessible resources, the computer system providing the accessible resources, each of the accessible resources having resource-identification information associated therewith, the graphical user interface arrangement comprising:

image sets, each of the image sets including at least one graphical image;

a like number of resource lists, each one of the resource lists being associated with one of the image sets, each one of the resource lists providing a pointer to at least one of the accessible resources; and     a control subsystem for enabling the computer system to display the at least one graphical image from the image sets as selected by the user, the control subsystem being independent of the accessible resources and being responsive to user-resource-information-display input to enable a display of the resource-identification information from the one of the resource lists associated with the at least one graphical image and further being responsive to user-resource-selection input selecting one of the accessible resources identified in the display of the resource-identification information to provide the user access to the one of the accessible resources that the user selected.

2. The graphical user interface arrangement according to claim 1 wherein the accessible resources includes both local and remote resources and wherein the control subsystem accesses each of the local and remote resources upon receiving the user-resource-selection input for both the local and remote resources.

3. The graphical user interface arrangement according to claim 1 wherein the control subsystem is adapted to receive from the user altered resource-identification information for each of the accessible resources and is responsive to display the altered resource-identification information.

4. The graphical user interface arrangement according to claim 1 further comprising categories which contain subsets of the accessible resources, the categories being associated with at least one of the image sets and being a member of at least one of the resource lists.

5. The graphical user interface arrangement according to claim 1 wherein the control subsystem displays as wallpaper the at least one graphical image associated with the user-resource-selection input.

6. The graphical user interface arrangement according to claim 5 wherein the wallpaper includes a matrix of cells where each cell contains the at least one graphical image.

7. The graphical user interface arrangement according to claim 1 wherein the computer system further includes a desktop upon which the control subsystem displays the image sets and the at least one graphical image and wherein each of the image sets is displayed upon the desktop as a window including a plurality of like windows for each graphical image in each of the image sets.

8. The graphical user interface arrangement according to claim 1 wherein each graphical image has an operative and inoperative state, the operative state is where the control subsystem displays the at least one graphical image as wallpaper when the user selects one of the accessible resources that is associated with the at least one graphical image, the inoperative state is where the control subsystem displays the at least one graphical image as a surfboard when the user has not selected one of the accessible resources associated with the at least one graphical image.

9. The graphical user interface arrangement according to claim 1 wherein the control subsystem is further adapted to display a toolbar being manipulatable by the user to select the at least one graphical image to be displayed.

10. The graphical user interface arrangement according to claim 1 wherein one or more of the image sets is associated with a set of the accessible resources and each graphical image included in the one or more image sets is associated with a subset of the set of the accessible resources.

11. The graphical user interface arrangement according to claim 1 wherein the control subsystem is responsive to user-link-input provided by the user associating the at least one graphical image with at least one of the accessible resources and generating the pointer and the resource-identification information of each of the at least one accessible resources.

12. The graphical user interface arrangement according to claim 11 wherein the at least one graphical image has an operative and inoperative state, the operative state is where the control subsystem displays the at least one graphical image as wallpaper when the user has selected the at least one graphical image, the inoperative state is where the control subsystem displays the at least one graphical image as a surfboard, the control subsystem associating the at least one graphical image in the operative state with the user-link-input.

13. The graphical user interface arrangement according to claim 11 wherein the user-link-input is the resource-identification information of the at least one graphical image.

14. The graphical user interface arrangement according to claim 1 wherein the control subsystem is further responsive to user-remove-link-input disassociating the at least one graphical image with an accessible resource by deleting the pointer and removing the resource-identification information in the resource lists associated with the at least one graphical image.

15. The graphical user interface arrangement according to claim 1 wherein the control subsystem executes the one of the accessible resources selected by the user.

16. A method of controlling a computer system, the computer system providing accessible resources, each of the accessible resources having resource identification information, the computer system further displaying image sets, each of the image sets having at least one graphical image, where the computer system displays the image sets and the at least one graphical image on a desktop of the computer system; the method comprising the steps of:

enabling the computer system to display the at least one graphical image from the image sets as selected by a user;

enabling the user to associate at least one of the accessible resources and the respective resource-indentification information with at least one of the image sets;

generating at least one resource list displayable by the computer system for each of the image sets to which the user associated the resource-identification information the at least one resource list having a pointer to each respective one of the accessible resources associated by the user;

displaying one of the resource lists associated with the at least one graphical image as the at least one graphical image is selected by the user; and     selecting one of the accessible resources identified by the resource-identification information to provide access to the one of the accessible resources associated with the resource-identification information that the user selected.

17. The method of controlling a computer system according to claim 16 wherein the accessible resources include both local and remote resources and wherein the step of selecting one of the accessible resources is indistinguishable to the user whether the user selects one of the local resources or one of the remote resources.

18. The method of controlling a computer system according to claim 16 wherein the accessible resources are applications that are external to independent of the image sets.

19. The method of controlling a computer system according to claim 16 wherein the step of selecting one of the accessible resources further includes the step of executing the one accessible resource selected by the user.

20. The method of controlling a computer system according to claim 16 wherein the step of selecting a resource further comprises displaying on the desktop the one of the accessible resources selected by the user that is currently executing on the computer system.

21. The method of controlling a computer system according to claim 16 further comprising the step of generating the image sets as selected by the user.

22. The method of controlling a computer system according to claim 16 further comprising the step of generating categories which contain subsets of the accessible resources, the categories being associated with the at least one graphical image and included in at least one of the resource lists.

23. The method of controlling a computer system according to claim 16 further comprising the step of associating at least one of the accessible resources with the image sets as associated by the user.

24. The method of controlling a computer system according to claim 16 further comprising the step of displaying on the desktop the at least one graphical image selected by the user as wallpaper.

25. The method of controlling a computer system according to claim 16 further comprising the step of displaying on the desktop the image sets and the at least one graphical image included in the image sets as a window.

26. The method of controlling a computer system according to claim 16 wherein each graphical image has an operative and inoperative state, the operative state is where one of the accessible resources associated with the at least one graphical image is selected and the at least one graphical image is displayed as wallpaper on the desktop, the inoperative state is where one of the accessible resources associated with the at least one graphical image is not selected and the at least one graphical image is displayed as a surfboard on the desktop.

27. The method of controlling a computer system according to claim 16 wherein the step of enabling the computer system to display the at least one graphical image from the image sets further comprises the step of providing a toolbar on the desktop that allows a user to cycle through the image sets and select the at least one graphical image to be displayed.

28. The method of controlling a computer system according to claim 16 wherein the step of displaying resource-identification information further comprises the step of generating a pop-up menu containing the resource-identification information.

29. The method of controlling a computer system according to claim 16 wherein the image sets and the at least one graphical image are each associated with substantially identical associated accessible resources.

30. The method of controlling a computer system according to claim 16 further comprising the steps of associating the resource-identification information with the at least one graphical image as selected by the user and generating the pointer to the one of the accessible resources associated with the resource-identification information.

31. An information organization tool for use on a computer system having accessible resources, the information organization tool being adapted to allow a user to organize the accessible resources of the computer system through association of the accessible resources with graphical images displayed on a desktop of the computer system, the information organizational tool comprising a control system adapted to access the accessible resources and associate at least one of the graphical images with at least one of the accessible resources, each of the at least one graphical images having an operative and inoperative state, the operative state is where the control subsystem displays the at least one graphical image as wallpaper on the desktop when the user selects one of the accessible resources that is associated with the at least one graphical image, the inoperative state is where the control subsystem displays the at least one graphical image as a surfboard when the user has not selected one of the accessible resources associated with the at least one graphical image.

32. An information organization tool according to claim 31 wherein the accessible resources are independent from the control system.

* * * * *

UNITED STATES PATENT AND TRADEMARK OFFICE
CERTIFICATE OF CORRECTION

PATENT NO. : 5,867,161
DATED : February 2, 1999
INVENTOR(S) : Aaron E. Walsh

It is certified that error appears in the above-identified patent and that said Letters Patent is hereby corrected as shown below:

Column 13, line 5, insert --and-- after "to"

Signed and Sealed this

Twenty-second Day of June, 1999

Attest:

Q. TODD DICKINSON

*Attesting Officer*          *Acting Commissioner of Patents and Trademarks*